Jan. 8, 1952  F. S. KINGSTON  2,581,958
ANTIFRICTION BEARING
Original Filed July 12, 1945

INVENTOR.
Frederick S. Kingston
BY
Harry S. ......
Atty.

Patented Jan. 8, 1952

2,581,958

UNITED STATES PATENT OFFICE 2,581,958

ANTIFRICTION BEARING

Frederick S. Kingston, North Plainfield, N. J., assignor to The Hoover Company, North Canton, Ohio, a corporation of Ohio Continuation of application Serial No. 604,616, July 12, 1945. This application June 15, 1949, Serial No. 99,205

5 Claims. (Cl. 308—189)

This invention relates to anti-friction bearings, and a principal object of the invention is to provide a way of permitting a wider range of tolerances in the fit between the movable race ring of the bearing, and the shaft or other rotary member to which the ring may be secured.

In a large majority of cases where anti-friction bearings are used the outer race ring remains stationary while the inner ring is press fitted to a shaft or other rotary member and rotates therewith. The present invention will be described, therefore, primarily in its relation to the above type of use. It will be apparent, however, that the principle of the invention is applicable also to assemblies wherein the inner ring is stationary and the outer ring is press fitted to a rotary member.

In anti-friction bearings, as used in practice, the inner and outer race rings are made of hardened steel as are the rolling elements positioned between the races of the race rings while the axially aligned stationary and rotary members between which the bearings are positioned are not hardened. Additionally, the race ring which is interfitted with the rotary member must have a comparatively tight press fit therewith so that the ring will rotate with the rotary member while the ring which is interfitted with the stationary member can fit rather loosely in comparison, in some cases the internal and external diameters of the interfitting parts can be the same, because if the tolerances are correct throughout there is little tendency for the stationary race ring to rotate relative to the stationary member.

It is highly desirable and, in fact, necessary to carefully control the internal fit of the rolling elements between the races of an anti-friction bearing. In some cases the fit between the rolling elements and the race rings may be close, whereas in others considerable looseness may be desirable. Thus, the bearings, as they come from the shop, may have internal fits varying from "line to line" wherein the parts fit without looseness or tightness to a rather free fit wherein the total play between the bearing parts may amount to several thousandths of an inch. When the inner race is pressed onto the shaft, it will expand and the original fit of the bearings is calculated with this fact in mind so that when the bearing has been mounted and the inner ring has been expanded the resulting internal fit of the bearing will conform to the particular requirements desired. In other words, the fit of the rolling elements between the races as the bearing is supplied by the manufacturer is somewhat looser than that required and the expansion of the inner ring will remove a certain amount of this looseness which exists before the bearing is installed.

In small motors, where the inner race ring is press fitted to a rotary shaft of comparatively small diameter, considerable tightness is required so that the inner ring will rotate with the shaft. As a result, if the shaft is not machined carefully to the exact size required and if the internal diameter of the inner ring is not held to size, considerable difficulty is experienced. If the fit is too loose the inner ring will not be expanded sufficiently to take up the internal slack in the internal fit between the races and the rolling elements and the bearing will be noisy. If the fit is too tight the inner ring will be expanded excessively and the rolling elements will bind in the races.

In order that the internal fit of the bearing after mounting may be properly controlled, it is customary for the manufacturer of the bearing to specify certain ranges of tolerances which the consumer must observe in forming the bearing seat on the shaft for proper accommodation of the particular bearing used. Usually, this working tolerance may be in the order of plus or minus .0002 of an inch or more corresponding to the size of the bearing. Such small working tolerances necessarily require careful machining and add materially to the cost of production.

I have discovered that this working tolerance may be materially increased by the simple expedient of reducing to a substantial degree the surface area of the shaft which actually engages the inner or seating surface of the inner race ring. This may be accomplished in various ways, for example, as by removing metal from the seat so as to form therein spaced grooves or recesses having the effect of reducing the area of the seat in actual contact with the inner ring while still obtaining sufficient grip upon the shaft and at the same time maintaining an adequate and stable support for the bearing. It is apparent that when an inner ring is press fitted to a shaft, there will result in addition to the expansion of the inner ring a corresponding but lesser compression of the shaft. By reducing the actual area of the bearing seat on the shaft the pressure of the ring upon the metal of the shaft will be imposed upon a smaller area and the pressure per unit of area, therefore, increased.

It is apparent that under those conditions the shaft will be subject to a greater amount of compression by the compressive action of the inner ring than in conventional cases where the surface of the seat is coextensive with the opposed surface of the inner ring, and that the application of the principle of the present invention will result in increased shaft compression with less corresponding expansion of the race ring.

The increased compressive force per unit of area upon the unhardened movable member will place the metal of the movable member under an elastic stress and will also cause some cold flow of the material into the voids produced between the oppposed surfaces of the hardened race ring and the unhardened movable member. When the hardened ring is removed from the movable member the metal of the movable member will recover somewhat due to its elasticity but will not return completely to its original diameter due to the cold flow of the metal into the voids.

The same result can be attained by undercutting the contacting area of the movable race ring before the hardening operation.

As a result of the present invention the tendency in the manufacture of the inner race ring and of the shaft will be towards a slight oversize in the shaft and undersize in the internal diameter of the race ring with the resultant increased latitude in the potential shaft compression which will materially increase the range of the working tolerances in the fit between the shaft and ring.

The main object of the present invention is to undercut the metal in one of the opposed surfaces between the rotary race ring and the rotary member which are press fitted together while maintaining a stable contact between them and also while maintaining press fit tolerances whereby the material of the rotatable member will be placed under increased compressive stresses per unit area of contact so as to cause the material of the rotatable member to have the tendency to cold flow into the valleys or voids thus formed and correspondingly to decrease the deformation of the hardened race ring in case the tolerances are too high.

Various embodiments of the invention are illustrated in the attached drawings wherein.

Figure 1:
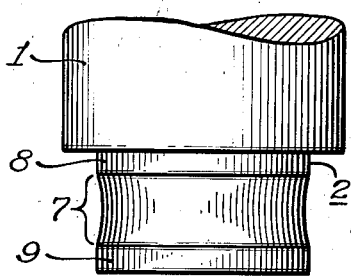
Figure 1 is a fragmentary view of a shaft having a bearing seat in accordance with this invention.
Figure 2:
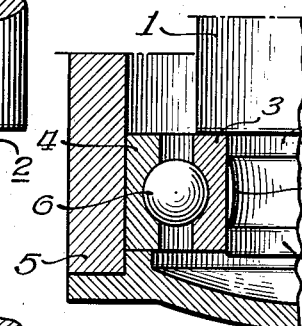
Figure 2 is a fragmentary sectional view showing an anti-friction bearing and its housing assembled with the shaft and seat.
Figure 7:
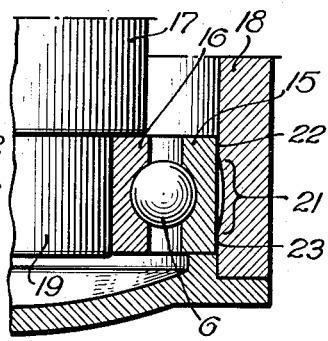
Figure 3:
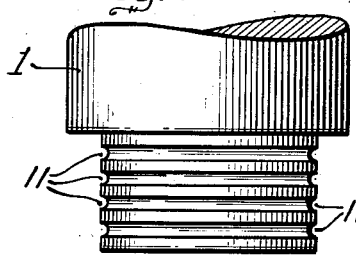
Figure 8:
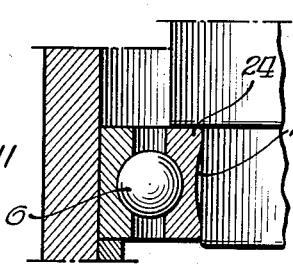
Figure 9:
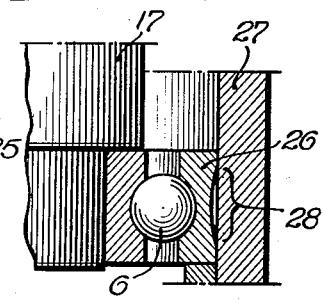

Figures 3 to 6, inclusive, are views corresponding to Fig. 1 but showing other embodiments of the invention; and Figures 7, 8, and 9 are views corresponding to Fig. 2 and illustrating other bearing structures according to the invention.

This application is a continuation of my copending application, Serial No. 604,616, filed July 12, 1945, now abandoned.

In Figs. 1 and 2 of the drawings, I have illustrated a shaft 1 having a reduced end 2 forming a seat for an anti-friction bearing. As shown in Fig. 2 the hardened inner race ring 3 of the bearing is press fitted over the end 2, the outer hardened race ring 4 of the bearing being fitted comparatively loosely within a fixed housing 5. A plurality of hardened rolling elements 6 are confined between races formed in the opposed faces of the inner and outer rings 3 and 4.

In accordance with the invention, the reduced end 2 of the shaft 1 is undercut to form a shallow recess 7 extending circumferentially about the end 2 in the cylindrical surface thereof. The actual seat for the inner ring 3 is thereby restricted to two cylindrical surfaces 8 and 9 at opposite sides of the recess 7. Thus, the surface area of the end 2 which is actually contacted by the inner surface of the inner ring 3, is reduced to a relatively small portion of the entire area, preferably in the neighborhood of fifty percent or less. Thus, the pressure of the ring 3, tending to compress the end 2, is applied to a relatively small surface area, and the pressure per unit of area is correspondingly great. Therefore, the degree of compression in the metal of the end 2 under the compressive action of the press fitted hardened ring 3 is relatively great, and the working tolerance is materially increased because an oversize on tolerance will expand the race ring less than it would with a full seat.

Figure 5:
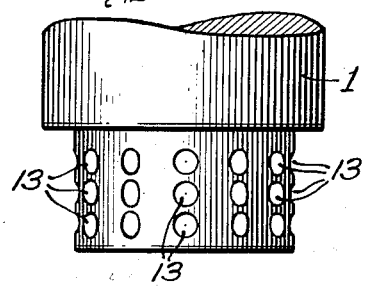
Figure 4:
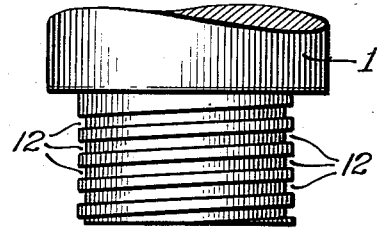
Figure 6:
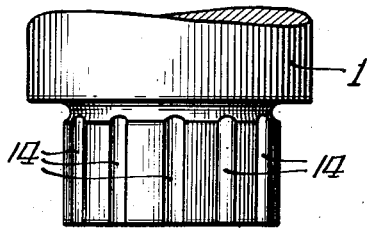

There are other ways for thus increasing the working tolerances in a device of the character herein described. In lieu of the single relatively wide recess 7, for example, a series of relatively narrow and relatively spaced recesses 11 may be employed, as in the embodiment of Fig. 3. The spaced recesses may also take the form of a continuous helical recess 12, as illustrated in Fig. 4. In Fig. 5 the actual area of the seat is reduced by means of a plurality of cylindrical spaced recesses 13; and in the embodiment of Fig. 6, a similar effect is obtained by a plurality of longitudinally disposed grooves or recesses 14.

In each of the embodiments described above, as in the majority of cases, the inner ring is press fitted to a movable shaft. In certain instances, however, the outer ring is the member of the anti-friction bearing which is associated with the rotary element and such an arrangement is illustrated in Fig. 7 where the outer ring is designated by the reference numeral 15 and the inner ring by the reference numeral 16. In this modification the shaft 17 is the relatively fixed element and the housing member 18 rotates about the shaft. Thus, the outer ring 15 of the bearing is press fitted into the housing 18, whereas the inner race ring 16 engages relatively loosely with the cylindrical surface of the shaft end 19. In accordance with the invention, that portion of the housing which forms the seat for the outer ring is undercut to form a narrow recess 21, so that in effect the ring is seated in the housing on two cylindrical surface areas 22 and 23 on opposite sides of the recess 21. In this modification, the under cut recess 21 affords a greater range of possible expansion of the seating surface of the housing 18 under the expansive action of the press fitted hardened outer race ring 21.

It will be noted that in Fig. 2 the cylindrical form of the recess in the bearing seat, in addition to reducing the active surface of the seat, also affords relief for the mid-portion of the inner ring which contains the ball race, permitting the inner ring to flex slightly and to thereby relieve pressure on the rolling elements 6.

In the structure shown in Figs. 8 and 9 the principle of the invention is used to permit a somewhat greater latitude in working tolerances. Thus, in Fig. 8 the inner ring 24 of the bearing is provided with a recess 25 extending around its inner peripheral surface seated on the end of the shaft to provide a recess into which the metal of the seat may flow because of the increased compression per unit of area. In Fig. 9 the same principle is employed in the outer ring 26 to increase the working tolerances in a press fit between the outer ring and the housing 27. In this instance the recess or groove in the outer ring is indicated by the reference numeral 28.

In Figs. 8 and 9 the press fit contact areas of the race rings are undercut in any suitable manner before the hardening operation with the result that when they are press fitted to the movable member, the reduced area of contact will result in an increased compressive stress on the metal of the unhardened rotary member which in turn will cause increased gripping action between the contacting surfaces per unit of area in contact and will have a tendency to cause the metal of the unhardened surface of the rotary member to cold flow into the voids or valleys formed in the hardened ring.

There may be other modifications without departing from the spirit of the invention, and it is to be understood that the term "press fit" as used herein is intended to embrace any means for mounting the race ring of an anti-friction bearing which involves pressure between the opposed surfaces of the ring and its seat. It is to be noted also that the character of recesses shown in Figs. 3 to 6, inclusive, may also be applied to the bearing ring itself, or to the housing seat as well as to the shaft as shown.

I claim:

1. In a bearing of the type including coaxial fixed and rotary members separated by an anti-friction bearing in the form of concentric hardened steel race rings having a plurality of hardened rolling elements positioned between the rings in rolling contact with the races thereof, the internal tolerances being such that excessive deformation of said race rings will cause said rolling elements to bind therein, the race rings having interfitting press fitted engagement with the rotary member and a comparatively looser fit with the stationary member, that improvement which comprises at least one internal undercut area in the press fit contact between the movable member and its race ring of sufficient extent to substantially increase the pressure per unit of area on the metal of the movable member by the compressive action of the ring to compress the metal of the rotary member and cause it to cold flow into the undercut area in case the tolerances between them is at a maximum and thereby prevent excessive deformation of the race ring which is press fitted to the rotary member.

2. In combination, axially aligned fixed and rotary members, an anti-friction bearing for radially spacing said fixed and rotary members, said bearing comprising inner and outer hardened steel race rings having races in their outer and inner surfaces respectively and a plurality of hardened rolling elements positioned between said rings in rolling contact with said races, the internal tolerances being such that excessive deformation of said race rings will cause said rolling elements to bind between said races, one of said rings being fitted comparatively loosely to said stationary member and the other of said rings being press fitted with said rotary member and requiring a substantial deforming pressure between the mating surfaces to cause it to rotate with said rotary member, the mating surfaces between said rotary member and the race ring press fitted thereto being undercut to form lands and voids between the mating surfaces to reduce the contact area between them whereby the pressure per unit of area upon the mating surfaces will be increased to cause the metal on the surface of said rotary member to cold flow into the voids in case the tolerances between said mating surfaces should cause the pressure between them to be excessive and thus reduce the deformation of the movable race ring.

3. In combination, an anti-friction bearing, a hardened stationary race ring, a hardened rotary race ring axially aligned with and radially spaced from said stationary race ring, hardened rolling elements interfitted between the races of said rings for rolling contact therewith, the internal tolerances between said rings and rolling elements being such that excessive deformation of either of said rings will cause said rolling elements to bind between the races of said rings, said stationary ring being interfitted to a stationary member with a comparatively loose press fit which will cause negligible deformation of said stationary ring, said rotary ring being press fitted over its peripheral area to a rotary member having a coresponding peripheral area with sufficient tightness to tend to cause substantial deformation of said ring, the peripheral surfaces between said rotary ring and said rotary member being undercut to form voids between their peripheral surfaces while maintaining a press fit between them so as to substantially decrease the area of contact between the peripheries of said rotary ring and rotary member, increase the compressive stress per unit of contact area on the peripheral surface of said rotary member and cause the metal of said rotary member in contact with the peripheral surface of said rotary ring to cold flow to some extent into the voids between the peripheral surfaces of said rotary member and ring.

4. In a bearing of the type including axially aligned and radially spaced fixed and rotary members separated by an anti-friction bearing having hardened steel inner and outer race rings at least one of which is press fitted to the rotary member, races in the outer and inner peripheries of said rings respectively, hardened steel rolling elements positioned for rolling contact with the races and separating the rings, the internal tolerances between the races and rolling elements being such that excessive deformation of either ring will cause the rolling elements to bind in the races and the ring which is fitted to the rotary member requiring the tighter press fit to cause the ring to rotate with the rotary member, that improvement which comprises at least one undercut region in the surface of one of the elements forming the contacting area between the rotary member and the ring fitted thereto to form lands and at least one valley between the contacting areas so as to reduce the area of contact between the rotary member and the ring fitted thereto to such an extent that the metal of the rotary member will be placed under sufficient pressure by the compressive action of the ring to cause it to cold flow into the valley when the press fit tolerance is too great and thus reduce excessive deformation of the ring press fitted to the rotary member.

5. In a bearing of the type including axially aligned and radially spaced fixed and rotary members having radially spaced bearing contact areas separated by an anti-friction bearing in the form of hardened steel inner and outer race rings one of which requires a press fit engagement with the bearing contacting area of the rotary member, races formed in the outer and inner peripheries of the rings respectively, hardened steel rolling elements positioned for rolling contact with the races and separating the rings, the internal tolerances between the races and rolling elements being such that excessive deformation of the rings will cause the rolling elements to bind in the races, that improvement which comprises depressed regions in the surface of one of the members forming the contacting area between the rotary member and the ring fitted thereto to form lands and valleys between them, said regions being of sufficient extent that the metal of the rotary member will be compressed and cold flow to some extent into the valleys when the press fit tolerance is greater than normal to thus reduce excessive deformation of the ring press fitted to the rotary member.

FREDERICK S. KINGSTON.

REFERENCES CITED

The following references are of record in the file of this patent:

UNITED STATES PATENTS

| Number | Name | Date |
|---|---|---|
| 1,013,151 | Foster | Jan. 2, 1912 |
| 1,423,950 | Leon | July 25, 1922 |
| 1,956,236 | Hughes | Apr. 24, 1934 |

FOREIGN PATENTS

| Number | Country | Date |
|---|---|---|
| 882,468 | France | June 4, 1943 |